United States Patent [19]

Nelson et al.

[11] Patent Number: 5,190,233
[45] Date of Patent: Mar. 2, 1993

[54] APPARATUS FOR CUTTING AND FEEDING STRIPS OF WEB MATERIAL

[75] Inventors: Jayson J. Nelson, Webster; William E. Payment, Rochester; Thomas A. Sisson, Hilton; Joseph A. Watkins, Rochester, all of N.Y.

[73] Assignee: Eastman Kodak Company, Rochester, N.Y.

[21] Appl. No.: 684,417

[22] Filed: Apr. 12, 1991

[51] Int. Cl.⁵ .................. B65H 19/26; B65H 20/12
[52] U.S. Cl. .................. 242/56 R; 242/67.2; 242/76; 226/95; 226/97
[58] Field of Search .......... 242/56 R, 57, 67.2, 242/76; 226/95, 97

[56] References Cited

U.S. PATENT DOCUMENTS

| | | | |
|---|---|---|---|
| 3,392,930 | 7/1968 | Goldfarb | 242/67.2 |
| 3,552,668 | 1/1971 | Kanno | 242/56 R |
| 3,570,778 | 3/1971 | Bushnell | 242/56 R |
| 4,189,105 | 2/1980 | Klinkhammer et al. | 242/56 R |
| 4,207,998 | 6/1980 | Schmid | 226/95 |
| 4,228,579 | 10/1980 | Dunkel et al. | 242/56 R |
| 4,249,688 | 2/1981 | Klemm | 226/24 |
| 4,335,858 | 6/1982 | Cranna | 242/76 X |
| 4,351,684 | 9/1982 | Gibbons et al. | 156/215 |
| 4,474,320 | 10/1984 | Rueger | 226/97 |
| 4,637,567 | 1/1987 | Tanaka et al. | 242/56 |
| 4,646,109 | 2/1987 | Toyama et al. | 226/95 X |
| 4,688,784 | 8/1987 | Wirz | 271/195 |
| 4,706,863 | 11/1987 | Hirakawa et al. | 271/276 |

Primary Examiner—John M. Jillions
Attorney, Agent, or Firm—Charles E. Snee, III

[57] ABSTRACT

An apparatus for cutting and feeding strips of web material includes a source (36) of an indeterminate length of web material; means (40–48) for withdrawing a predetermined portion (10) of web material from the source; a guide track (56, 98–104) for receiving the lead end of the portion and guiding its edges along a curved path; a rotatable vacuum drum (60) positioned intermediate the ends of the curved path for gripping the portion; a cutter (50) for cutting the web to define a strip; and a motor drive arrangement (62, 64, 66) for rotating the vacuum drum to feed the strip along the curved path.

17 Claims, 4 Drawing Sheets

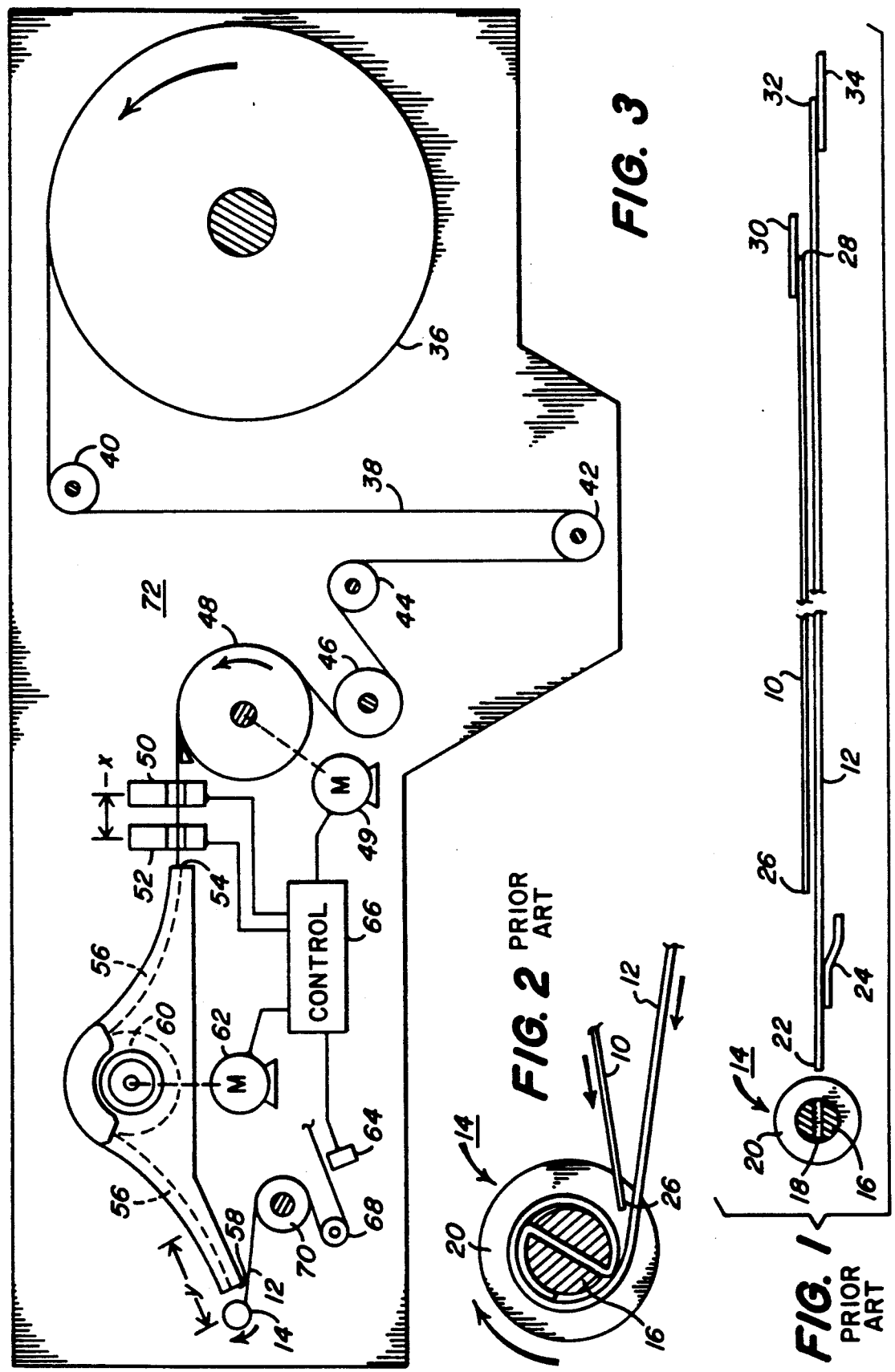

APPARATUS FOR CUTTING AND FEEDING STRIPS OF WEB MATERIAL

Technical Field

The present invention is related to apparatus for cutting and feeding strips from an indeterminate length of web material. More particularly, the invention concerns such apparatus for cutting and delivering strips of light sensitive material such as photographic film or paper for winding onto spools.

BACKGROUND ART

In the manufacture of such light sensitive materials, lengths or webs of film or paper many hundreds or thousands of feet in length are prepared in widths desired for end products and then wound on stock rolls. These rolls are then installed in spooling equipment which removes the web from the stock roll in strips of predetermined length which are then wound onto a spool for eventual use by the customer. For some types of photographic film, the strip is wound onto a spool which is then encased in a light tight magazine or cartridge; while for other types, the strip is wound onto the spool together with a longer strip of light tight wrapper material, typically a special type of paper, thus making unnecessary the use of a further magazine for the wound spool. Films wound in the latter manner with a wrapper material have been used for decades.

FIG. 1 shows an edge view of a strip of film 10 and a strip of protective wrapper material 12, which for ease of illustration and explanation, are shown superimposed on one another in a flattened state prior to winding onto a well-known type of spool 14, shown partially in section. The core 16 of spool 14 comprises an axially extending slot 18; and radially extending flanges 20 are provided at either end of core 16, only one flange being illustrated. In the familiar manner, wrapper strip 12 is provided near its lead end 22 with an after-use label 24 which is used by the customer to secure the wrapper strip about the exposed film after the customer has unwound the film and wrapper from spool 14 and rewound the film and wrapper onto a take-up spool in a camera. Label 24 is applied to wrapper strip 12 before winding onto spool 14. The lead end 26 of film strip 10 is unattached to wrapper strip 12; however, the tail end 28 is attached to wrapper strip 12 during winding by an inside paster strip 30 which typically is attached to film strip 10 just after the strip is cut from the stock roll. Thus, when wrapper strip 12 is wound onto the take-up spool in a camera, film strip 10 is drawn along by inside paster strip 30. Also in the familiar manner, wrapper strip 12 is provided at its tail end 32 with an outside paster strip 34 which secures the wrapper strip about the unexposed film prior to sue by the customer. In the familiar manner, tail end 32 also may be folded back on itself, not illustrated, before outside paster strip 34 is applied, to provide a more convenient finger grip for the customer when opening the spool prior to use.

During winding of wrapper strip 12 and film strip 10, lead end 22 is threaded through slot 18 and spool 14 is rotated clockwise, as viewed in FIG. 2, so that the lead portion of wrapper strip 12 is wound onto core 16. Then, lead end 26 is introduced into the nip formed between the remainder of wrapper strip 12 and the portion already wound onto core 16; so that lead end 26 becomes cinched between convolutions of the wrapper strip, after which the wrapper and film strips are wound together. The wrapper strip eventually is cut and when inside paster strip 30 is drawn into the nip, it adheres to wrapper strip 12. After an additional length of wrapper strip has been wound onto the spool, outside paster strip 34 is applied to complete the process.

In known equipment of the type used to wind film and wrapper strips in the manner just described, the film is drawn from its stock roll by an intermittently operated vacuum drum which feeds the film past a cutting mechanism into a curved guide track until the lead end of the film enters the nip between a pair of resilient rollers. After the film has been cut to form a strip, the rollers are driven to insert the lead end of the film into the nip formed by the wrapper strip in the manner previously described. A disadvantage of the use of such rollers is that they apply pressure to the film which, with modern pressure sensitive films, can lead to pressure induced marks in the processed film. In addition, such rollers tend to scuff the surfaces and edges of the film which also can lead to unwanted defects in the processed film. And, because the rollers must be at a fixed distance from the cutter to acquire the lead end of the film strip before cutting, the position of the rollers must be changed or multiple sets of rollers must be provided if film strips of different lengths are to be cut and fed. Another difficulty of such equipment has been to match the velocities of the wrapper strip and the film strip as the film enters the nip formed by the wrapper strip. If the film strip is moving too slowly, its lead end will not be accurately positioned relative to the wrapper strip, which can lead to misregistration of the film in the camera. If the film strip is driven only slightly faster than the wrapper strip, then a slight negative tension may be applied to the film which can help avoid pressure induced marks. However, if the film strip is moving too quickly, its lead end may stub over on encountering the nip which can cause undesirable irregularities during winding and lead to pressure induced marks.

SUMMARY OF THE INVENTION

A primary objective of the present invention is to provide an apparatus for cutting and feeding strips of web material, such as photographic film, in which the strips can be fed to a subsequent processing station, such as a spooler, without subjecting the film to pressure from drive rollers.

Another objective of the present invention is to provide such an apparatus in which the velocities of the film strip and wrapper strip can be closely matched when the film strip enters the nip formed by the wrapper strip during winding.

Still another objective of the present invention is to provide such an apparatus in which film strips of different lengths can be cut and fed without requiring any reconfiguration of the apparatus.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

In an apparatus according to the invention, a source of an indeterminate length of web material is connected to means for withdrawing a predetermined portion of the web material from the source, the predetermined portion having a lead end and longitudinally extending edges. Guide track means are provided for receiving the lead end and guiding the edges of the web along a curved path in order to minimize curl of the web transverse to its edges, the curved path having entrance and exit ends. A rotatable vacuum drum means is positioned intermediate the entrance and exit ends of the curved path. A peripheral portion of the vacuum drum means is substantially congruent with at least a part of the curved path, so that the vacuum drum means is effective for gripping the web along such part of the curved path. A cutter means is positioned between the means for withdrawing and the guide track means, for severing a strip of web material from the indeterminate length. Finally, means are provided for rotating the vacuum drum means to feed such a strip along the guide track means following such severing. Thus, the vacuum drum means holds the lead end of the web material stationary until the cutter means has been actuated, after which the vacuum drum means is rotated to feed the lead end of the just-cut strip onto a subsequent processing station, such as a spooler.

Preferably, the cutter means is spaced from the part of the curved path by a first distance sufficiently less than a desired minimum length of such a strip to permit the lead end to be gripped by the rotatable vacuum drum means along that part of the curved path. In order to accommodate film strips of different lengths, the guide track means has a first end for receiving the lead end of the film strip and a second end for discharging the lead end, the second end being spaced from the cutter means by a second distance greater than a desired maximum length of such a strip to permit the lead end to remain within the guide track means during such severing. Preferably, the guide track means supports substantially only the edges of the web along the curved path on either side of the rotatable vacuum drum means. The guide track means may comprise a pair of elongated, oppositely facing tracks each comprising a longitudinally extended groove for receiving one of the edges of the web, the grooves being positioned opposite one another to minimize curl of the web or strip transverse to its edges. In some applications, the apparatus may further comprise means, positioned between the tracks and outboard of the grooves, for directing a flow of air against such a strip while such a strip is fed along the curved path.

In order to match the velocities of the film strip and the wrapper strip, the apparatus of the invention may comprise means, located near the discharge end of the guide track means, for rotating a spool for winding such a strip, means for engaging a length of wrapper material with such a spool whereby a lead portion of such wrapper material is wound onto such a spool and means for detecting when such lead portion is partially wound onto such a spool. In such a case, the means for rotating the vacuum drum means responds to the means for detecting to accelerate the lead end of such a strip from the discharge end of the guide track means and into engagement with the nip formed between the lead portion of such wrapper material and the remainder of the length of wrapper material, with the lead end of such strip moving at a velocity substantially matching that of such wrapper material at the moment of such engagement.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 1 shows a view, partially in section, of a strip of wrapper material, a strip of film and their labels and pasters adjacent a spool of the type onto which the strips can be wound.

FIG. 2 shows a view, partially in section, of a spool onto which the initial portion of a strip of wrapper material has been wound, just as the lead end of the film strip is about to be inserted into the nip formed by the strip of wrapper material.

FIG. 3 shows a schematic view of a film spooling system embodying the apparatus according to the invention.

DESCRIPTION OF THE PREFERRED EMBODIMENTS

Figure 4:
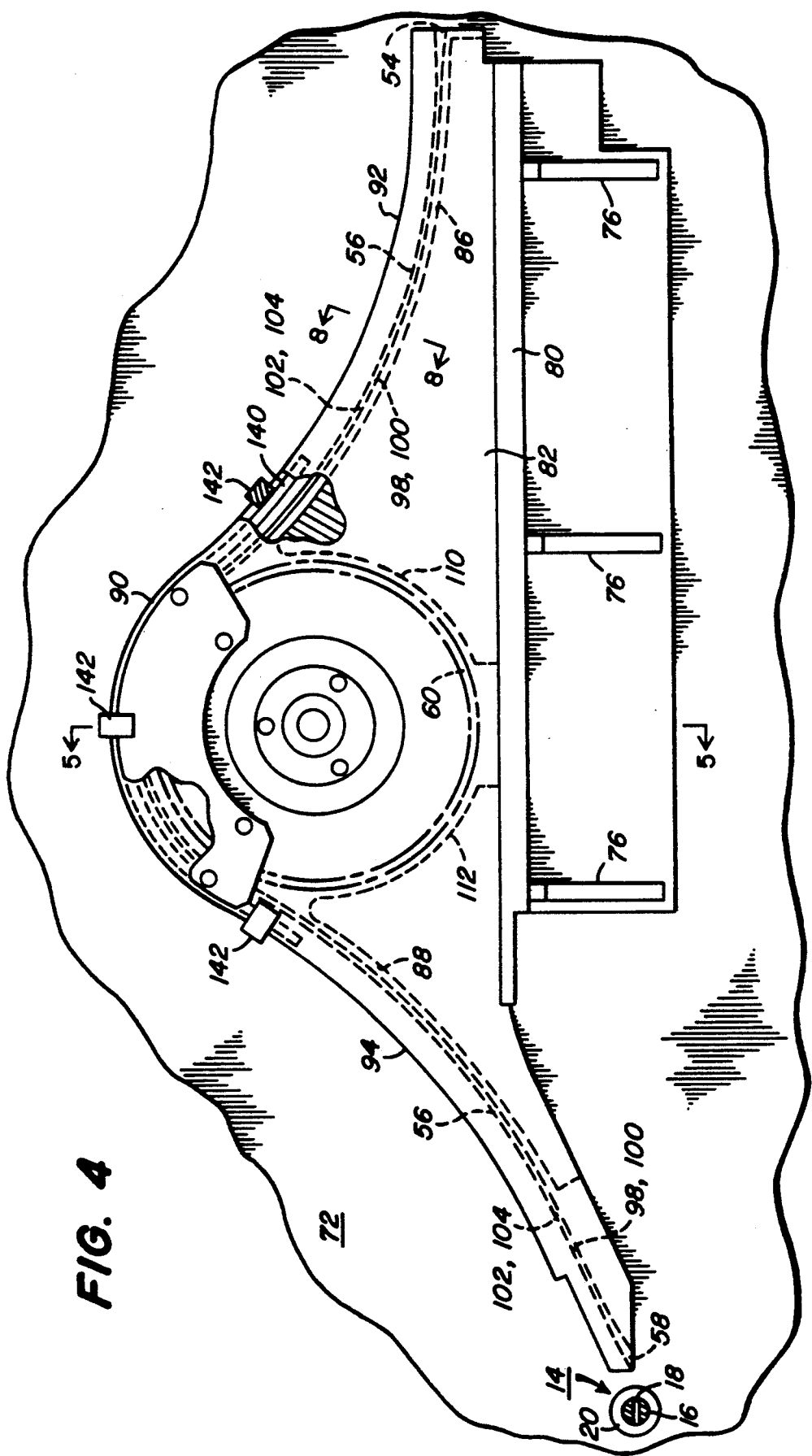
FIG. 4 shows a front elevation view, partially in section, of the film track vacuum feed drum according to the invention.

The following is a detailed description of the preferred embodiments of the invention, reference being made to the drawings in which the same reference numerals identify the same elements of the structure in each of the several Figures.

Figure 5:
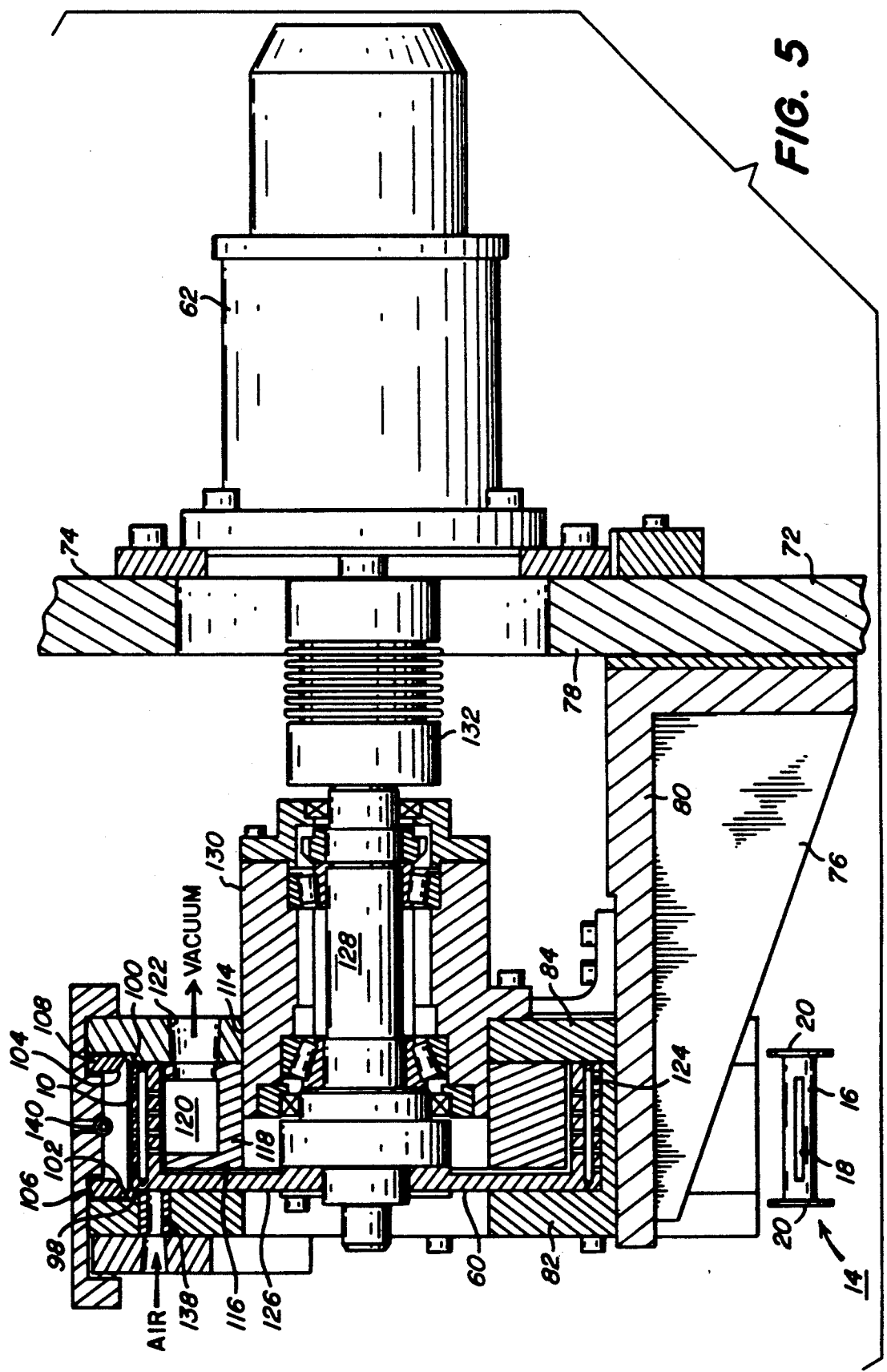
FIG. 5 shows a section view taken along line 5—5 of FIG. 4.
Figure 6:
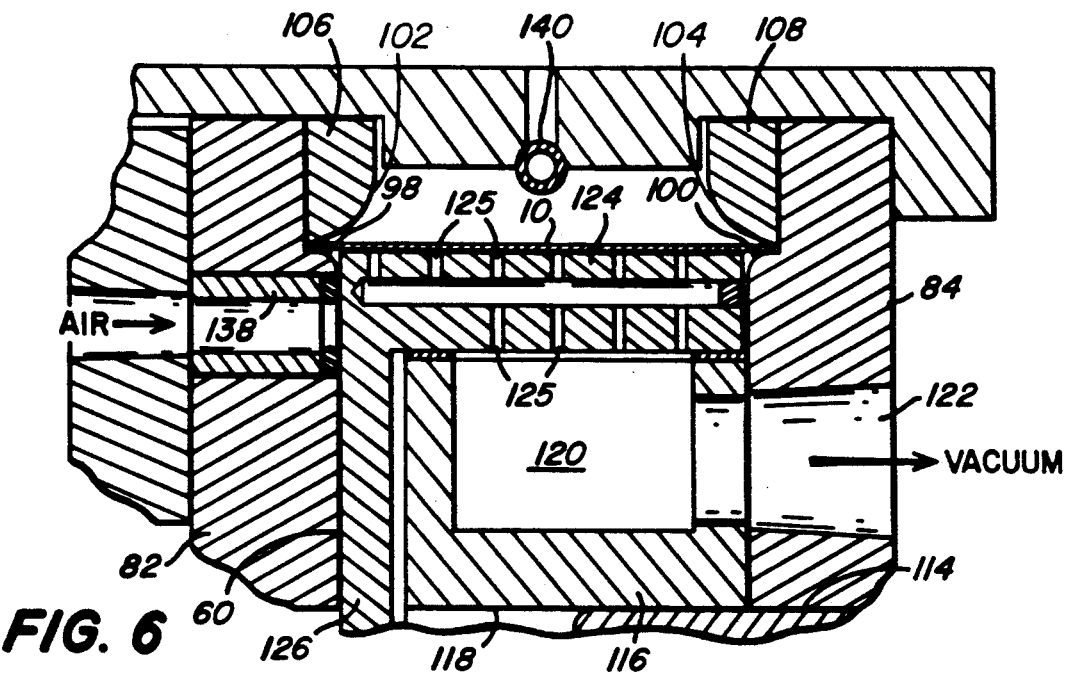
FIG. 6 shows an enlarged fragmentary view of a portion of the structure shown in FIG. 5, illustrating details of the passages for application of vacuum to the film.

As shown in FIG. 3, a power driven stock roll 36 comprises a source of an indeterminate length 38 of web material, such as photographic film. Length 38 passes around rollers 40,42 or a conventional tensioner, not illustrated, around a pair of idler rollers 44,46 and around a conventional vacuum drum 48 which comprises a means for withdrawing a predetermined portion of web material from roll 36. Drum 48 is rotated intermittently by a motor 49 to withdraw such a predetermined portion and feed its lead end past a conventional cutter means 50, past a conventional apparatus 52 for applying inside paster strips 30 and into the entrances end 54 of a guide track means 56. For simplicity of illustration, the fixtures for guiding the web to entrance end 54 are not shown, their structure being familiar to those skilled in the art. As will be discussed with regard to FIGS. 4 to 8, guide track means 56 preferably guides the edges of the web along a curved path, in order to minimize curl of the web transverse to its edges, from entrance end 54 to an exit end 58. A rotatable vacuum drum means 60, of the type shown in FIGS. 4 to 6, is positioned intermediate entrance end 54 and exit end 58 with a peripheral portion of the drum of, say, 75° circumferential extent being substantially congruent with at least a part of the curved path defined by guide track means 56. A motor 62 is provided to rotate drum means 60.

The distance from the location at which cutter means 50 severs the web to the portion of the curved path which is substantially congruent with drum means 60 is sufficiently less than the desired minimum length of a film strip 10 cut from length 38 to permit the lead end of the strip to be gripped by drum means 60 while the tail end of the strip is being cut. After cutter means 50 has cut the strip, motor 62 is operated to rotate drum means 60 sufficiently to advance the tail end of the strip away from cutter means 50 through a distance "x" into position for application of an inside paster strip 30 by apparatus 52. Motor 62 is then operated, if necessary depending on the length of the film strip, to advance the film strip through guide track means 56 until the lead end of the film strip is a distance "y" from approximately the axis of rotation of a spool 14 positioned near exit end 58. Distance "y" is chosen to enable motor 62 to accelerate the strip to a velocity which substantially matches that of a strip 12 of wrapper material already being wound onto a spool 14 in the manner previously described.

Wrapper strip 12 is supplied from a source, not illustrated, and passes an optical detector 64 which can detect a mark, notch or other indicium on strip 12 and issue a signal to a controller 66, indicating that the lead portion of wrapper strip 12 is partially wound onto spool 14. After passing detector 64, wrapper strip 12 passes around an idler roller 68 and a driven vacuum/air drum 70 which feeds the strip through suitable guides, not illustrated, into engagement with spool 14. Such guides may be conventional or of the type shown in the concurrently filed, commonly assigned application of Jospeh A. Watkins, David H. Lancy and Jayson J. Nelson for Apparatus for winding a Strip of Web Material onto a Spool. Once the lead end of wrapper strip 12 has begun to wind onto the spool, the speed of drum 70 is reduced gradually to zero and air is applied to support the wrapper strip as it moves past the drum. In operation, when detector 64 senses the indicium on wrapper strip 12 and issues a signal to controller 66, the controller actuates motor 62 to rotate vacuum drum means 60 and accelerate film strip 10 in guide track means 56 to leave exit end 58 and move into engagement with the nip formed between the lead portion of wrapper strip 12 and the remainder of the wrapper strip, with the film strip moving at a velocity substantially matching that of the wrapper strip at the moment of engagement of the film strip with the nip.

Figure 7:
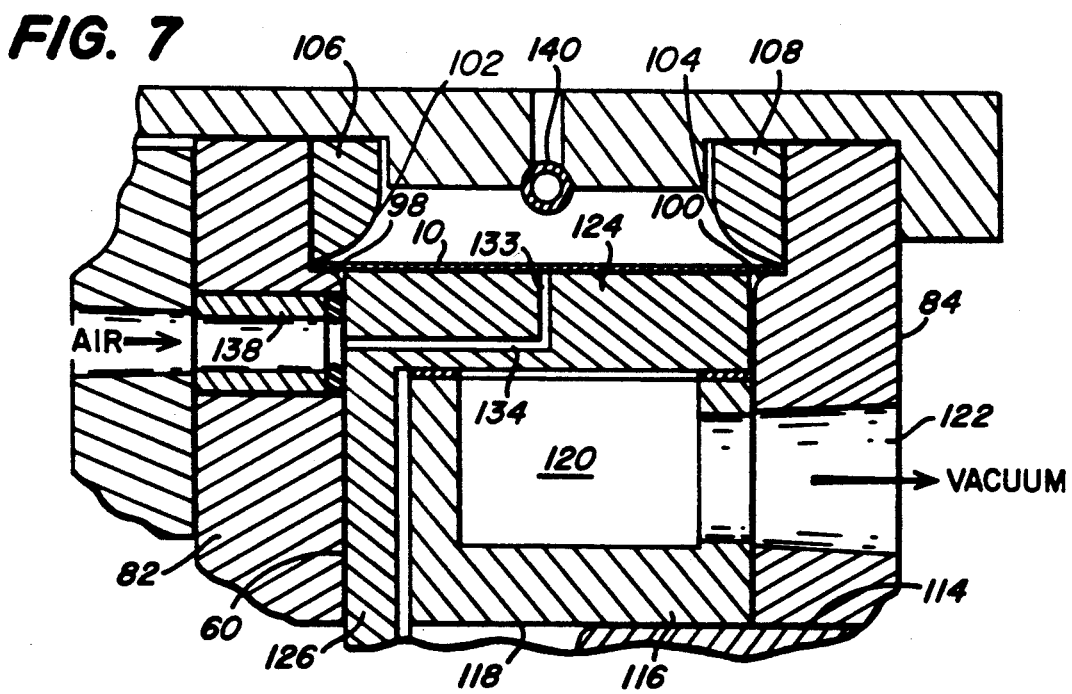
FIG. 7 shows an enlarged fragmentary view of a portion of the structure shown in FIG. 5, illustrating details of passages for flow of air beneath the film.
Figure 8:
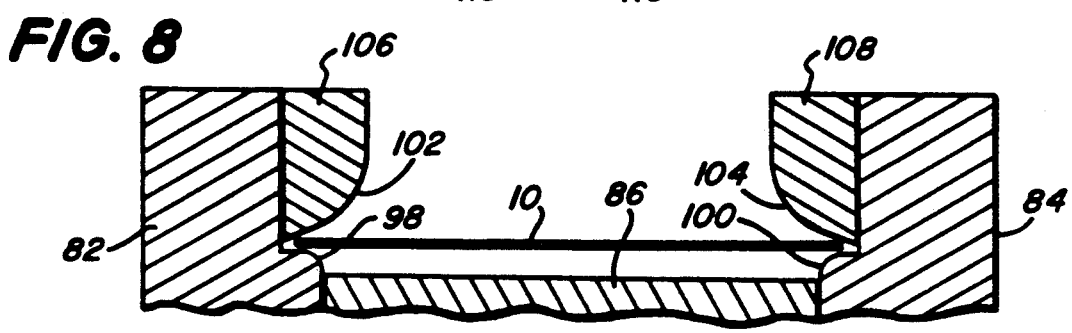
FIG. 8 shows a section view taken along line 8—8 of FIG. 4.

FIGS. 4 to 8 illustrate the details of guide track means 56 and vacuum drum means 60. A rigid face plate 72 is positioned substantially vertically to support the components of the system shown in FIG. 3 with the various motors mounted on the back side 74 of face plate 72. A welded support bracket 76 is suitably attached to the front side 78 of face plate 72 and includes a substantially horizontal shelf portion 80 on which vacuum drum means 60 is supported. A front track side plate 82 and a rear track side plate 84 are spaced apart by a distance somewhat less than the width of film strip 10 by means of an entrance track spacer 86 shown in FIGS. 4 and 8 and an exit track spacer 88 shown in FIG. 4, which are suitably bolted between the side plates. Side plates 82,84 are similarly shaped and include a central upwardly curved portion 90 which may extend over an arc of 90° or so and which flairs smoothly into a downwardly curved entrance portion 92 terminating at entrance end 54 and a downwardly curved exit portion 94 terminating at exit end 58. As seen in FIG. 4, side plates 82,84 need not be symmetrical about the center of curved portion 90, as exit portion 94 drops below the level of shelf portion 80 to position exit end 58 near spool 14. As shown in phantom in FIG. 4 and in section FIGS. 5 to 7, the opposed surfaces of side plates 82,84 are relieved along their upper edges to define the curved lower surfaces 98,100 of a pair of elongated, oppositely facing tracks through which the film strips move. The curved upper surfaces 102,104 of such tracks are provided on a pair of oppositely facing track inserts 106,108 attached to and extended along the upper edges of the opposed surfaces of side plates 82,84. Thus, each pair of surfaces 98,106 and 100,104 defines a longitudinally extending groove for receiving one of the edges of a film strip 10, the grooves being positioned directly opposite one another to minimize curl transverse to the edges of the film. Side plates 82,84 and inserts 106,108 preferably are made from a mold quality stainless steel capable of taking a high surface polish. The surfaces 98,106 and 100,104 which define the longitudinally extending grooves should be smoothly finished and the depth of the grooves, particularly on their upper sides should be sufficient to prevent film strip 10 from easily popping out of the grooves during operation. As indicated in FIG. 8, the upper surfaces of track spacer 86,88 are positioned below the path of film strip 10, so that the film strip is supported only at its edges by the longitudinally extending grooves as it moves through the entrances and exit portions of the guide track means. As indicated in FIG. 4, the grooves preferably are flared outwardly at entrance end 54 and exit end 58 to ease passage of the film strip.

As shown in FIG. 4, track spacers 86,88 are provided with opposed cylindrical surfaces 110,112, so that a more or less cylindrical volume is provided below upwardly curved portions 90 for receiving vacuum drum means 60. Side plate 84 is provided with a bore 114 and a manifold ring 116, preferably having a central bore 118 equal in diameter to bore 114, is fixedly mounted concentrically with bore 114. Manifold ring 116 comprises an arcuate chamber 120 of, say, 120° circumferential extent, which communicates through a port 122 to a vacuum source, not illustrated. Vacuum drum means 60 is mounted for rotation about manifold ring 116 and comprises axially extending rim 124 through which is provided a circumferentially and axially extending pattern of radial passages 125 which, in the familiar manner, communicate successively with chamber 120 as the vacuum drum is rotated. See also FIG. 6. Suitable seals may be provided between rim 124 and manifold ring 116 to minimize air leakage, in the familiar manner. An upper portion of rim 124, of, say, 120° circumferential extent, is positioned to be substantially congruent with a corresponding portion of the curved path along which film strip 10 is to move; so that, after the lead end of the strip has fully entered such portion, vacuum can be applied to chamber 120 to draw the strip into contact with the drum. Rim 124 is formed integrally with a central disk 126 bolted to a spindle 128 rotatably supported by a bearing assembly 130 mounted on side plate 84 and extended through bores 114,188. A conventional coupling 132 operatively connects spindle 128 to motor 62 mounted on the back side of face plate 72.

In operation of the apparatus shown in FIGS. 4 to 8, vacuum is applied to port 122 when it is desired to move a film strip along the curve path toward spool 14. When the lead end of the film strip has become engaged with the nip formed by the wrapper strip and the film strip begins to be wound onto the spool with the wrapper, the speed of motor 62 is reduced gradually to zero and chamber 120 is vented to atmospheric pressure. At the same time, as shown in FIG. 7, a flow of air is introduced through a central circumferentially extending row of radial passages 133 in rim 124 by means of a circumferentially extending row of axial passages 134 also provided in rim 124, to support strip 10 as it moves past vacuum drum means 60. To introduce air into passages 134, an arcuate air gland 138 of, say, 120° circumferential extent is provided along an arc corresponding to the extent of chamber 120.

Some film strips 10 occasionally exhibit a tendency of curl upward as viewed in FIG. 6, which may prevent their being properly acquired by vacuum drum means 60 and could lead to their jumping out of guide track means 56. To combat this tendency, the apparatus of the invention may be provided with an air tube 140 positioned above vacuum drum means 60 and extended somewhat beyond the ends of the arc in which film strip 10 is gripped by the vacuum drum. Air tube 140 may be provided along its length with a series of downwardly facing openings, not illustrated, through which a flow of air may be directed to prevent the film from curling upward. A plurality of brackets 142 may be used to position air tube 140 between side plates 82,84 and may be provided with suitable couplings, not illustrated, for introducing air into the tube.

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for cutting and feeding strips of web material, comprising:
   a source of an indeterminate length of web material;
   means for withdrawing a predetermined portion of said web material from said source, said portion having a lead end and longitudinally extending edges;
   guide track means for receiving said lead end and guiding said edges along a curved path to minimize curl of said portion transverse to said edges, said curved path having entrance and exit ends;
   rotatable vacuum drum means, positioned intermediate said entrance and exit ends and provided with a peripheral portion substantially congruent with at least a part of said curved path, for gripping said portion along said part of said curved path;
   cutter means, positioned between said means for withdrawing and said guide track means, for severing said portion from said indeterminate length to form such a strip of web material; and
   means for rotating said vacuum drum means to feed such a strip along said guide track means following said severing.

2. Apparatus according to claim 1, wherein said cutter means is spaced from said part of said curved path by a first distance sufficiently less than a desired minimum length of such a strip to permit said lead end to be gripped by said rotatable vacuum drum means along said part of said curved path.

3. Apparatus according to claim 2, wherein said guide track means has a first end for receiving said lead end and a second end for discharging said lead end, said second end being spaced from said cutter means by a second distance greater than a desired maximum length of such a strip to permit said lead end to remain within said guide track means during said severing.

4. Apparatus according to claim 3, wherein guide track means supports substantially only said edges along said curved path on either side of said rotatable vacuum drum means.

5. Apparatus according to claim 4, wherein said guide track means comprises a pair of elongated, oppositely facing tracks each comprising a longitudinally extended groove for receiving one of said edges, said grooves being positioned opposite one another to minimize curl of said portion or such a strip transverse to said edges.

6. Apparatus according to claim 5, further comprising means, positioned between said tracks and outboard of said grooves, for directing a flow of air against such strip while such strip is fed along said part of said curved path.

7. Apparatus according to claim 1, wherein said guide track means has a first end for receiving said lead end and a second end for discharging said lead end, said second end being spaced from said cutter means by a distance greater than a desired maximum length of such a strip to permit said lead end to remain within said guide track means during said severing.

8. Apparatus according to claim 7, wherein guide track means supports substantially only said edges along said curved path on either side of said rotatable vacuum drum means.

9. Apparatus according to claim 8, wherein said guide track means comprises a pair of elongated, oppositely facing tracks each comprising a longitudinally extended groove for receiving one of said edges, said grooves being positioned opposite one another to minimize curl of said portion or such a strip transverse to said edges.

10. Apparatus according to claim 9, further comprising means, positioned between said tracks and outboard of said grooves, for directing a flow of air against such strip while such strip is fed along said part of said curved path.

11. Apparatus according to claim 1, further comprising means, positioned between said tracks and outboard of said grooves, for directing a flow of air against such strip while such strip is fed along said part of said curved path.

12. Apparatus according to claim 1, wherein guide means supports substantially only said edges along said curved path on either side of said rotatable vacuum drum means.

13. Apparatus according to claim 12, wherein said guide track means comprises a pair of elongated, oppositely facing tracks each comprising a longitudinally extended groove for receiving one of said edges, said grooves being positioned opposite one another to minimize curl of said portion or such a strip transverse to said edges.

14. Apparatus according to claim 13, further comprising means, positioned between said tracks and outboard of said grooves, for directing a flow of air against such strip while such strip is fed along said part of said curved path.

15. Apparatus according to claim 1, wherein said guide track means comprises a pair of elongated, oppositely facing tracks each comprising a longitudinally extended groove for receiving one of said edges, said grooves being positioned opposite one another to minimize curl of said portion of such a strip transverse to said edges.

16. Apparatus according to claim 15, further comprising means, positioned between said tracks and outboard of said grooves, for directing a flow of air against such strip while such strip is fed along said part of said curved path.

17. Apparatus according to claim 1, wherein said guide track means has a first end for receiving said lead end and a second end for discharging said lead end, further comprising:
   means located near said second end for rotating a spool for winding such a strip;
   means for engaging a length of wrapper material with such a spool whereby a lead portion of such wrapper material is wound onto such a spool;
   means for detecting when such lead portion is nearly wound onto such a spool; and
   wherein said means for rotating such vacuum drum means responds to said means for detecting to accelerate said lead end of such a strip from said second end of said guide track means and into engagement between said lead portion of such wrapper material and the remainder of said length of wrapper material with said lead end of such strip moving at a velocity substantially matching that of such wrapper material at the moment of said engagement.

* * * * *